United States Patent [19]
Jones

[11] Patent Number: 4,772,037
[45] Date of Patent: Sep. 20, 1988

[54] DEVICE FOR THE PREVENTION OF VEHICULAR OVERTURN OF ALL TERRAIN VEHICLES

[76] Inventor: Jerry C. Jones, 753 N. Spring Valley Pkwy., Elko, Nev. 89801

[21] Appl. No.: 42,667

[22] Filed: Apr. 27, 1987

[51] Int. Cl.<sup>4</sup> .............................................. B62J 9/00
[52] U.S. Cl. .................................. 280/293; 280/755; 280/763.1; 280/767
[58] Field of Search .................... 280/755, 757, 763.1, 280/767, 47.2, 293, 289 R; 180/9.32; 74/11

[56] References Cited

U.S. PATENT DOCUMENTS 4,154,452  5/1979  Newman .
4,522,420  6/1985  Hannappel ........................ 280/293

Primary Examiner—John J. Love
Assistant Examiner—Richard Camby
Attorney, Agent, or Firm—K. S. Cornaby

[57] ABSTRACT

An invention which prevents the overturning of ALL Terrain Vehicles (ATV's) when such vehicles are driven up an incline of sufficient grade so as to cause the lighter-weighted front end of the vehicle to rear backwards causing a backward overturn. This invention, which consists of a tire attached to a bracketing system, which in turn is mounted to the rear of an ATV, provides a stabilizing support to the rear of the vehicle in incidences of imminent overturn. The device is easily attached to most ATV's of different manufacture, and do not interfere with the operation of the vehicle when driven on flat or slightly hilly surfaces.

7 Claims, 1 Drawing Sheet

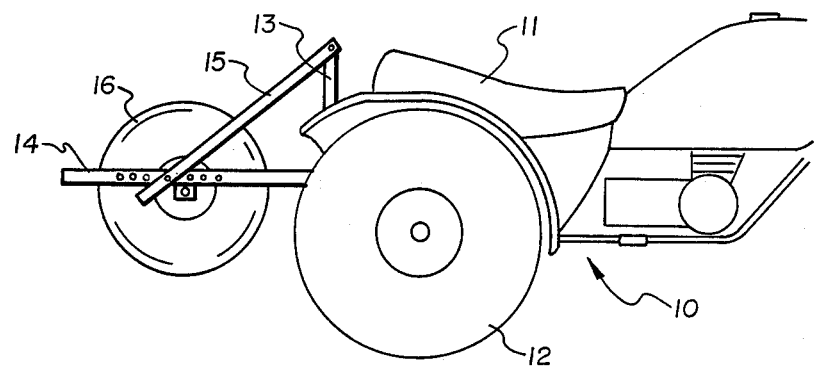
Fig. 1
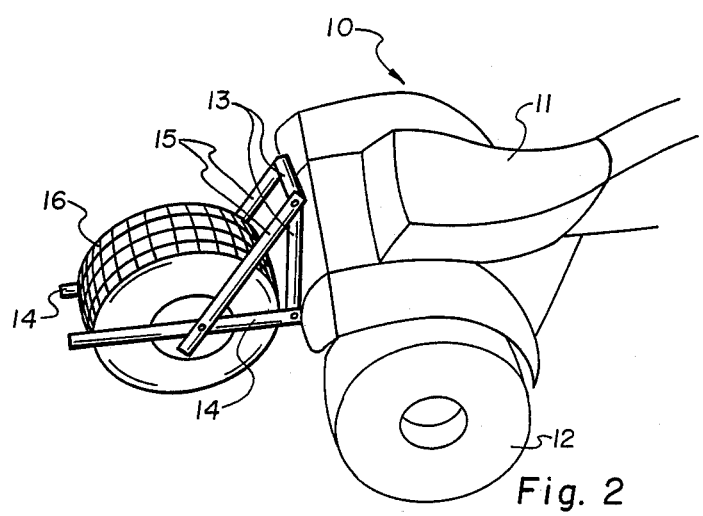
Fig. 2
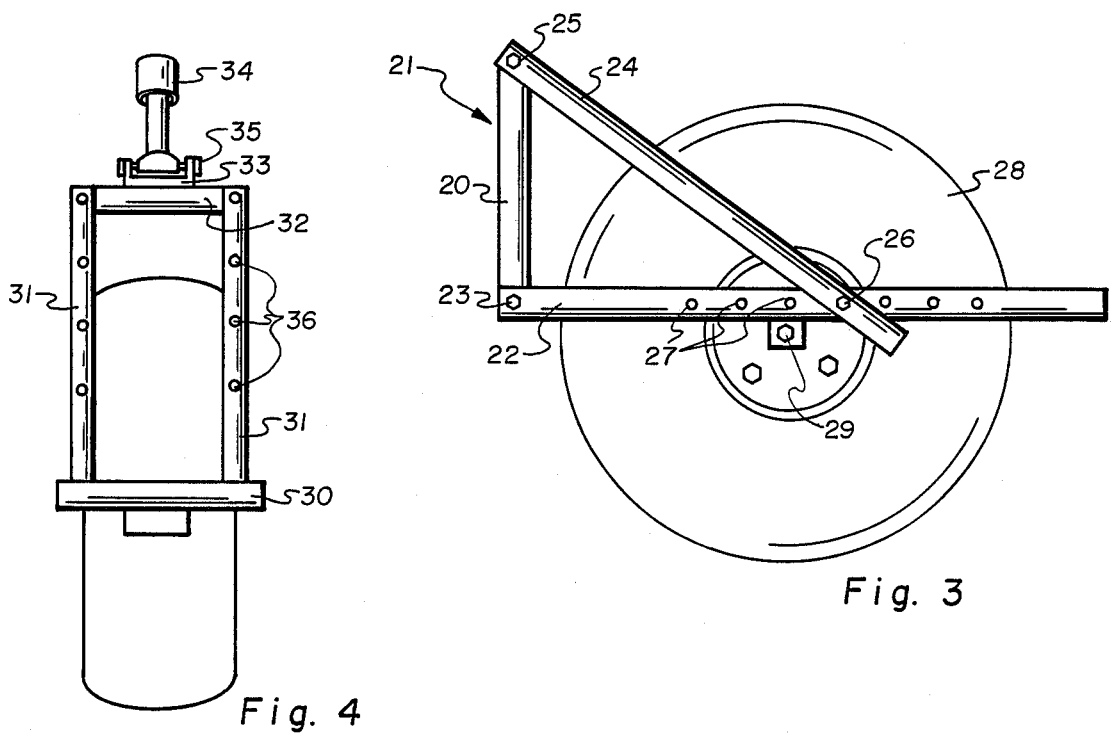
Fig. 3
Fig. 4

DEVICE FOR THE PREVENTION OF VEHICULAR OVERTURN OF ALL TERRAIN VEHICLES

BACKGROUND OF THE INVENTION

This invention relates to the currently popular activity of outdoor recreation through the use of All Terrain Vehicles (hereinafter referred to as "ATV's"), three-wheeled vehicles of a motorcycle character. Said vehicles are most often ridden in isolated areas such as sand dunes, deserts, and mountain areas, and are operated by young children as well as adults.

ATV operator's generally find the sport in the activity in attempting to surmount terrestrial challenges or obstacles, such as dunes or hillsides. Frequently such vigorous attempts result in the front wheel of the vehicle raising off the ground, thereafter followed by rotation of the vehicle in a backward direction, displacing the operator from his seat and further resulting in the falling of the machine on the operator. These vehicular overturns usually result in damage to the vehicle, varying degrees of injury to the operator, and oftentimes, death. Indeed, the number of injuries and deaths related to ATV overturns has aroused great emotion and concern regarding the use of ATV's, particularly by young children. Further, heightened concern for the safety of operators of ATV's has prompted abundant legislation for regulation of the use of ATV's, and has attempted to impel ATV manufacturers to acknowledge the inherent dangers of these vehicles.

ATV afficiandos, the class of individuals most likely to suffer injury from use of these vehicles, paradoxically are adverse to the making of modifications by ATV manufacturers which might "tame" the vehicles while providing adequate (or legislated) safety features.

This invention, therefore, is a device which can be attached to almost all manufacturers of ATV's, and which provides a means of prevention of vehicular overturns when the ATV is being driven up a sloping terrain. Additionally, the device has the feature of adjustability for varying grades of terrain. Further, the device does not interfere in the operation of the vehicle on flat terrain. Use of this device by prudent ATV operators will significantly reduce the number of vehicular overturns, thus avoiding damage to the vehicle, and, more importantly, reducing the incidence of severe injury or death in ATV operators.

SUMMARY OF THE INVENTION

This device for the prevention of overturns of ATV's is comprised of a tire which is disposed at the rear of the ATV machine by means of a bracketing system which is attachable to the ATV.

The bracketing system includes a series of bars in quadrangular arrangement which attach in a vertical orientation to the back end of an ATV, behind the seat and between the rear tires of the vehicle. The vertical bars of said bracket maintain a plurality of holes down their length, to which a cross bar may be attached at either end to said vertical bars; the cross bar has mounted upon it a shock absorber which attaches at its other end to the framework of the ATV. It is contemplated, therefore that the shock absorber may be adjusted in its orientation between the vertical bracket and frame of the ATV by attachment of the cross bar, to which the shock absorber is mounted, at any point along the vertical bracket.

Extending out perpendicularly from either bottom corner of said vertical bracket are bars, connected at the bottom corners of said bracket by adjustable screw or bolt means. Attached at either upper corner of said quadrangular bracket are bars, attached to the vertical bracket, as described, by adjustable screw or bolt means. The bars attached at the upper end of the vertical bracket are disposed downwardly, intersecting with the lower bars which extend from the vertical bracket, so as to produce a triangular orientation of the described bars. The upper diagonal bars and lower horizontal bars maintain a plurality of holes along their length so that the bars attached at the upper corners of the vertical bracket may be rotated at that juncture and thereby caused to intersect with the horizontal bars at any point along their length thereby described by said holes; this movement enables adjustment of the tire in an up and down direction.

The tire of the device is mounted to the horizontal bar members of the bracketing system by placement of a rod through the axis of the tire mount, the ends of said rod being attached to the horizontal bars by an adjustable screw or bolt means.

The bracketing system as above described attaches to the frame or under carriage of the ATV by means of supporting bar members, the dimensions of which vary, and the exact means of attachment to the vehicle being variable, dependent upon the structural specifications of each ATV.

When the bracketing system and tire of the device are mounted to an ATV in the operative mode, the tire of the device is maintained above ground level relative to the tires of the ATV. Therefore, when the device is mounted to an ATV, it in no way interferes with the operation or movement of the ATV while being driven on horizontal or moderately hilly terrain. When the ATV is ridden up a significant grade, however, at the point when the vehicle begins to overturn backwards as a result of the predominance of weight of the vehicle being directed toward the rear of the machine, the tire of the device provides a means of stabilization of the vehicle as the tire of the device hits the ground.

The bracketing system of the device may be made of solid metal or some equivalent sturdy material. The dimensions of the members of the bracketing system are variable without affecting the efficacy of the device, and similarly, the specifications of the device tire is variable. It is conceivable that, in fact, more than one tire might be mounted on the bracketing system. The device has the added advantage of being easily attached to an ATV and easily adjusted by the vehicle owner.

It is an objective of this device to provide a means for prevention of ATV overturns through the mounting of a bracketing system and tire on the rear portion of an ATV which stabilizes the rear of the vehicle in instances when the ATV begins to tip backwards while being driven up an inclined surface.

It is further an objective of this device to provide a means of prevention of ATV overturns which is easily installed on the vehicle and is adjustable for variations in ATV's and riding surfaces.

THE DRAWINGS

Preferred embodiments of the invention are illustrated in the attached drawings, in which:

FIG. 1 is a side-elevational view of the device illustrating its attachment to an ATV;

FIG. 2 is a perspective view of the device illustrating its attachment to an ATV;

FIG. 3 is a side elevational view of the bracketing system and tire; and

FIG. 4 is an end view of the vertical bracketing system and tire, taken at 90° to the view in FIG. 3.

DETAILED DESCRIPTION OF THE ILLUSTRATED EMBODIMENTS

FIG. 1 and FIG. 2 generally illustrate the orientation of the device when attached in the operative mode to the back end of an ATV where the ATV is generally indicated at 10, the saddle of the vehicle is indicated at 11, and the tires of the vehicle are noted at 12. The quadrangular vertical bracket 13 is attached to the frame and/or the undercarriage of the ATV by means when are not illustrated herein. Extending horizontally out from the vertical bracket are bars 14, and attached to the upper end of the vertical bracket; disposed downwardly, are bars 15. At the point of intersection of each lower bar 14 to upper bar 15, the two are joined by screw or bolt means. The tire 16 is disposed between the two horizontal bars and connected there between by means which will be illustrated in FIG. 3.

FIG. 3 is an illustration of the bracketing system and tire in which the vertical side bar 20 of the quadrangular vertical bracket, generally at 21, has extending from its lower corner horizontal bar 22, which is attached to the vertical bar by adjustable screw or bolt means 23. Extending from the upper corner of the vertical bracket, and disposed downwardly, is bar 24, which attaches to the vertical bracket by adjustable screw or bolt means 25. Said lower bar 22 and upper bar 24 are connected by adjustable screw or bolt means 26 at the point of their intersection. The horizontal bar 22 maintains a plurality of holes 27 which allow for the intersection and attachment of the upper bar 24 at any point along the length of the lower bar 22, thus providing for adjustment of the tire in vertical direction. It is understood that although the foregoing discussion of the members of the bracketing system were stated in the singular, a similar series of bar members exists on either side of the tire. Through the center of the tire 28 is disposed a rod which attaches at either end to the horizontal bars at 29.

FIG. 4 illustrates the quadrangular vertical bracket which attaches to the rear of the ATV. The bracket is composed of a lower horizontal member 30, vertical side members 31, and an upper horizontal crossbar member 32. To the center of crossbar member is attached a fastener bracket 33 to which is attached one end of a shock absorber 34 by means of a pin 35. The vertical side bars 31 maintain a plurality of holes down their length which allows for the attachment of the crossbar 32, here shown attached at the upper point, at any point on the vertical side bars. The variety of placement of the crossbar allows adjustment in the shock absorber to accommodate different sizes of shock absorbers and to accommodate structural variations in ATV's.

I claim:

1. An apparatus for the prevention of overturn of an all terrain vehicle, comprising in combination:

a tire bracketing device adjustably attached to the rearward end of an all terrain vehicle comprising a quadrangular vertical bracket, from which extends at each upper corner downwardly disposed bar members, and from each bottom corner of which extends horizontal bar members, said downwardly disposed bar members and horizontal bar members being attached at their intersecting points by adjusting bolt means; and a tire which is rotatably and adjustably mounted to said bracketing device, said device having the capability of being mounted on said all terrain vehicle so as to rest a pre-determined distance above the level on which the vehicle rests.

2. An apparatus as set forth in claim 1, in which each bar member is attached to the vertical bracket member at its corners by adjustable bolt means.

3. An apparatus as set forth in claim 1, in which each of the horizontal bar members maintains a plurality of apertures along the length thereof to provide a multiplicity of intersection points with the downwardly disposed bar members for adjustment purposes.

4. An apparatus as set forth in claim 1, in which the quadrangular vertical bracket comprises two vertical side bar members, a horizontal bar member attached at the bottom of said vertical side bar members, and a cross bar attached at the top of said vertical side bar members.

5. An apparatus as set forth in claim 4, in which said cross bar has a shock absorber attached thereto at one end of the shock absorber, the other end of the shock absorber being attached to the vehicle.

6. An apparatus as set forth in claim 4, in which said vertical side bar members maintain a plurality of apertures along the length thereof such that said crossbar member may be attached at any point along the length of the vertical bar members.

7. An apparatus as set forth in claim 1, in which a tire is mounted to the horizontal bar members by virtue of a rod extending through the center of said tire, each end of said rod being attached to one of the horizontal bar members by means of an adjustable bolt means.

* * * * *